(12) United States Patent
Bean

(10) Patent No.: US 11,296,876 B1
(45) Date of Patent: Apr. 5, 2022

(54) PARALLEL CROSS-DOMAIN GUARD ENGINES WITH SEQUENTIAL CRYPTOGRAPHIC CONTROLS

(71) Applicant: Rockwell Collins, Inc., Cedar Rapids, IA (US)

(72) Inventor: Reginald D. Bean, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 32 days.

(21) Appl. No.: 17/018,637

(22) Filed: Sep. 11, 2020

(51) Int. Cl.
   *H04L 9/08* (2006.01)
   *H04L 9/34* (2006.01)
   *H04L 9/06* (2006.01)

(52) U.S. Cl.
   CPC .............. *H04L 9/0869* (2013.01); *H04L 9/06* (2013.01); *H04L 9/34* (2013.01)

(58) Field of Classification Search
   CPC ............ H04L 9/0869; H04L 9/06; H04L 9/34
   USPC ........................................................ 713/171
   See application file for complete search history.

(56) References Cited

U.S. PATENT DOCUMENTS

| | | | |
|---|---|---|---|
| 4,227,253 A | 10/1980 | Ehrsam et al. | |
| 8,218,574 B2 | 7/2012 | Mackey et al. | |
| 8,600,049 B2 | 12/2013 | Gueron et al. | |
| 8,881,260 B1 | 11/2014 | Hardin et al. | |
| 9,774,630 B1 | 9/2017 | Kamin, III | |
| 10,015,152 B2 | 7/2018 | Resch et al. | |
| 10,162,968 B1 | 12/2018 | Kumar et al. | |
| 10,846,391 B1 * | 11/2020 | Bonney | A61B 5/318 |
| 2009/0055934 A1 * | 2/2009 | Jauer | G06F 21/52 726/26 |
| 2017/0347065 A1 | 11/2017 | Krishnan et al. | |

* cited by examiner

Primary Examiner — Michael S McNally
(74) Attorney, Agent, or Firm — Suiter Swantz pc llo

(57) ABSTRACT

A system and method for cross-domain parallel inspection of data packets in transit between domains of differing security classification incorporating sequential cryptographic control is disclosed. In embodiments, the system includes first and second random number generators, each generating a one-time pad for transmission to both a corresponding front-end cryptographic engine and a parallel guard engine. The cryptographic engines double encrypt the data packet in sequence according to the one-time pads, storing the encrypted packet in a holding register. Each guard engine inspects the data packet in parallel, indicating approval by transmitting a release to the holding register and sending its one-time pad to a back-end cryptographic engine. When the holding register receives both releases, the double encrypted packet is sequentially decrypted by the back-end cryptographic engines in reverse order according to the one-time pads received from the guard engines. The fully decrypted data packet is transferred to the second domain.

13 Claims, 6 Drawing Sheets

PARALLEL CROSS-DOMAIN GUARD ENGINES WITH SEQUENTIAL CRYPTOGRAPHIC CONTROLS

TECHNICAL FIELD

The subject matter disclosed by the instant application is directed generally to computing systems having multiple levels of security and more particularly to cross-domain security solutions.

BACKGROUND

Cross-domain security solutions (e.g., governing the secure transfer of data between domains of differing security classifications) will need to demonstrate both redundancy and non-bypassability in order to be certified. One way of achieving this would be for redundant guard engines, each of which inspects data packets against one or more security policies, to operate sequentially; e.g., a first guard engine analyzes each packet, followed by a second guard engine. However, this sequential approach may lead to excess processing latency.

SUMMARY

A cross-domain cryptographic system incorporating parallel guard engines and sequential cryptography is disclosed. In embodiments, the cross-domain cryptographic system includes a holding register and guard engines connected in parallel between a first domain at a first security classification level and a second domain at a second security classification level. Each of the guard engines receive data packets in transit between the first domain and the second domain. Random number generators (RNG) generate one-time pads (e.g., random numbers) for each guard engine; e.g., a first RNG sends a first one-time pad to the first guard engine and a first front-end cryptographic engine and a second RNG sends a second one-time pad to the second guard engine and a second front-end cryptographic engine, the front-end cryptographic engines connected in series between the first domain and the holding register. The first front-end cryptographic engine encrypts the data packet according to the first one-time pad, passing the single encrypted data packet to the second front-end cryptographic engine, which double-encrypts the data packet according to the second one-time pad. The double-encrypted data packet is kept in the holding register until released. The first and second guard engines inspect the data packet in parallel, each guard engine sending a release signal to the holding register to indicate a successful inspection. Upon a successful inspection, the first and second guard engines also respectively send their first and second one-time pads to first and second back-end cryptographic engines serially connected between the holding register and the second domain. When the double-encrypted data packet is released from the holding register, the first back-end cryptographic engine partially decrypts the double-encrypted data packet according to the second one-time pad, and the second back-end cryptographic engine fully decrypts the single-encrypted data packet according to the first one-time pad. The inspected and decrypted data packet is then passed to the second domain.

In some embodiments, the front-end and back-end cryptographic engines are bitwise exclusive-or (XOR) cryptographic engines.

In some embodiments, the guard engines are redundant guard engines.

In some embodiments, the guard engines are dissimilar guard engines, each guard engine associated with one or more distinct security policy sets.

In some embodiments, the first guard engine indicates a rejection (e.g., an unsuccessful inspection) of the data packet by withholding its release signal from the holding register and/or withholding the first one-time pad from the first back-end cryptographic engine.

In some embodiments, the second guard engine indicates a rejection of the data packet by withholding its release signal from the holding register and/or withholding the second one-time pad from the second back-end cryptographic engine.

In some embodiments, the first or second guard engine indicates a rejection of the data packet by clearing the holding register.

In some embodiments, the first or second guard engine indicates a rejection of the data packet by notifying the first domain and/or the second domain of the rejection.

A method for parallel cross-domain inspection with sequential cryptographic control is also disclosed. In embodiments, the method includes receiving, via a first front-end cryptographic engine and two or more parallel guard engines, a data packet in transit between a first domain having a first security classification and a second domain having a second security classification. The method includes generating a first one-time pad via a first RNG. The method includes transmitting the first one-time pad to the first front-end cryptographic engine and to a first parallel guard engine. The method includes generating a second one-time pad via a second RNG. The method includes transmitting the second one-time pad to the second front-end cryptographic engine and to a second parallel guard engine. The method includes single encrypting, via the first front-end cryptographic engine, the data packet according to the first one-time pad. The method includes double encrypting, via the second front-end cryptographic engine, the single encrypted data packet according to the second one-time pad. The method includes storing the double encrypted data packet in a holding register connected in parallel between the first and second domains. The method includes inspecting, via each parallel guard engine, the data packet according to one or more security policies. The method includes, upon a successful inspection of the data packet by the first guard engine, transmitting a first release signal to the holding register and the first one-time pad to a first back-end cryptographic engine connected in series between the holding register and the second domain. The method includes, upon a successful inspection of the data packet by the second guard engine, transmitting a second release signal to the holding register and the second one-time pad to a second back-end cryptographic engine connected in series between the first back-end cryptographic engine and the second domain. The method includes, when the holding register has received a release signal from all guard engines, releasing the double encrypted data packet to the first back-end cryptographic engine. The method includes [0014] partially decrypting the double encrypted data packet via the first back-end cryptographic engine according to the first one-time pad. The method includes fully decrypting the at least one partially decrypted data packet via the at least one second back-end cryptographic engine according to the at least one second one-time pad. The method includes transferring the fully decrypted and inspected data packet to the second domain.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
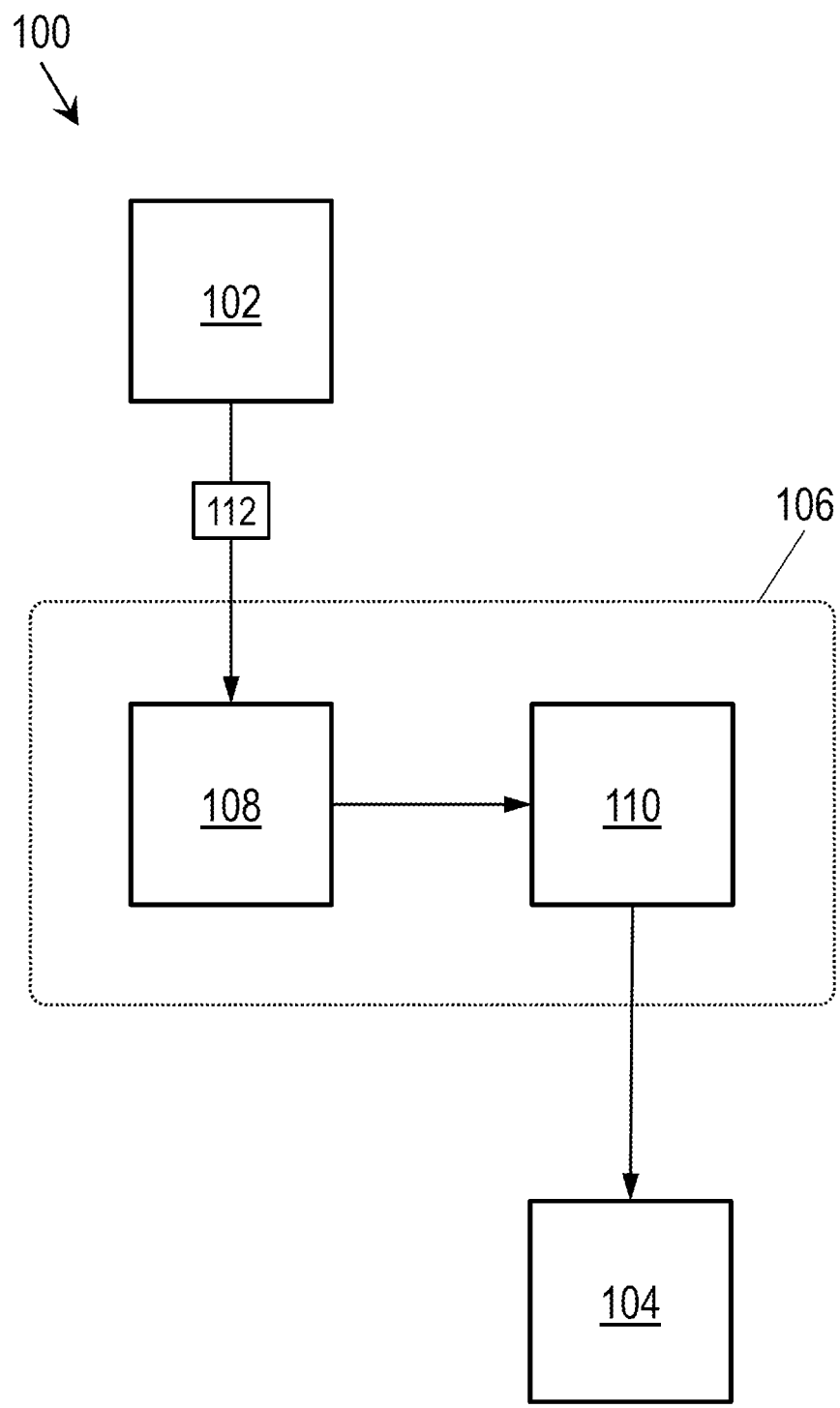
FIG. 1 is a block diagram illustrating a cross-domain cryptographic system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are broadly directed to cross-domain solutions for the secure transfer of data between different domains of a processing environment having multiple independent levels of security (MILS), e.g., differing security classification levels. Such a cross-domain solution provides the necessary redundancy without adding latency to the system.

Referring to FIG. 1, a MILS processing environment 100 is shown. The MILS processing environment 100 may include a first processing domain 102, a second processing domain 104, and a cross-domain solution 106 having guard engines 108, 110.

In embodiments, the first domain 102 and the second domain 104 may have significantly different (e.g., and/or mutually incompatible) security classification levels and/or security policies. Conventional cross-domain solutions may achieve certifiability by providing both redundancy and non-bypassability (e.g., any data traveling between the first domain 102 and the second domain 104 cannot bypass the cross-domain solution 106). One way of achieving both objectives is sequential processing, whereby the guard engines 108 and 110 are dissimilar guard engines. For example, the first guard engine 108 (e.g., primary guard engine) may analyze an outbound data packet (112; e.g., in transit between the first domain 102 and the second domain 104) against one or more policies and, should the data packet be found passable, passes the data packet to the second guard engine 110 (e.g., secondary guard engine), which also analyzes the data packet against one or more policies. Should the second guard engine 110 also find the data packet 112 passable, it will be passed along to the second domain 104.

In embodiments, the cross-domain solution 106 may achieve the redundancy and non-bypassability of the conventional approach described above, but without the processing latency associated with sequential processing. For example, the first domain 102 and the second domain 104 may represent any two physical devices or components within the MILS environment 100, or any two virtual components (e.g., if the MILS environment 100 is a multi-core processing environment virtualized by a hypervisor and/or operating system). The guard engines 108, 110 of the cross-domain solution 106 may be redundant guard engines, or they may be dissimilar guard engines configured for data analysis (e.g., of data packets 112 in transit between the first domain 102 and the second domain 104) according to dissimilar policy sets. In embodiments, the cross-domain solution 106 preserves a redundant and non-bypassable path between the first domain 102 and the second domain 104 without the latency associated with sequential processing by configuring the guard engines 108, 110 in parallel while providing for sequential cryptographic controls.

Figure 2:
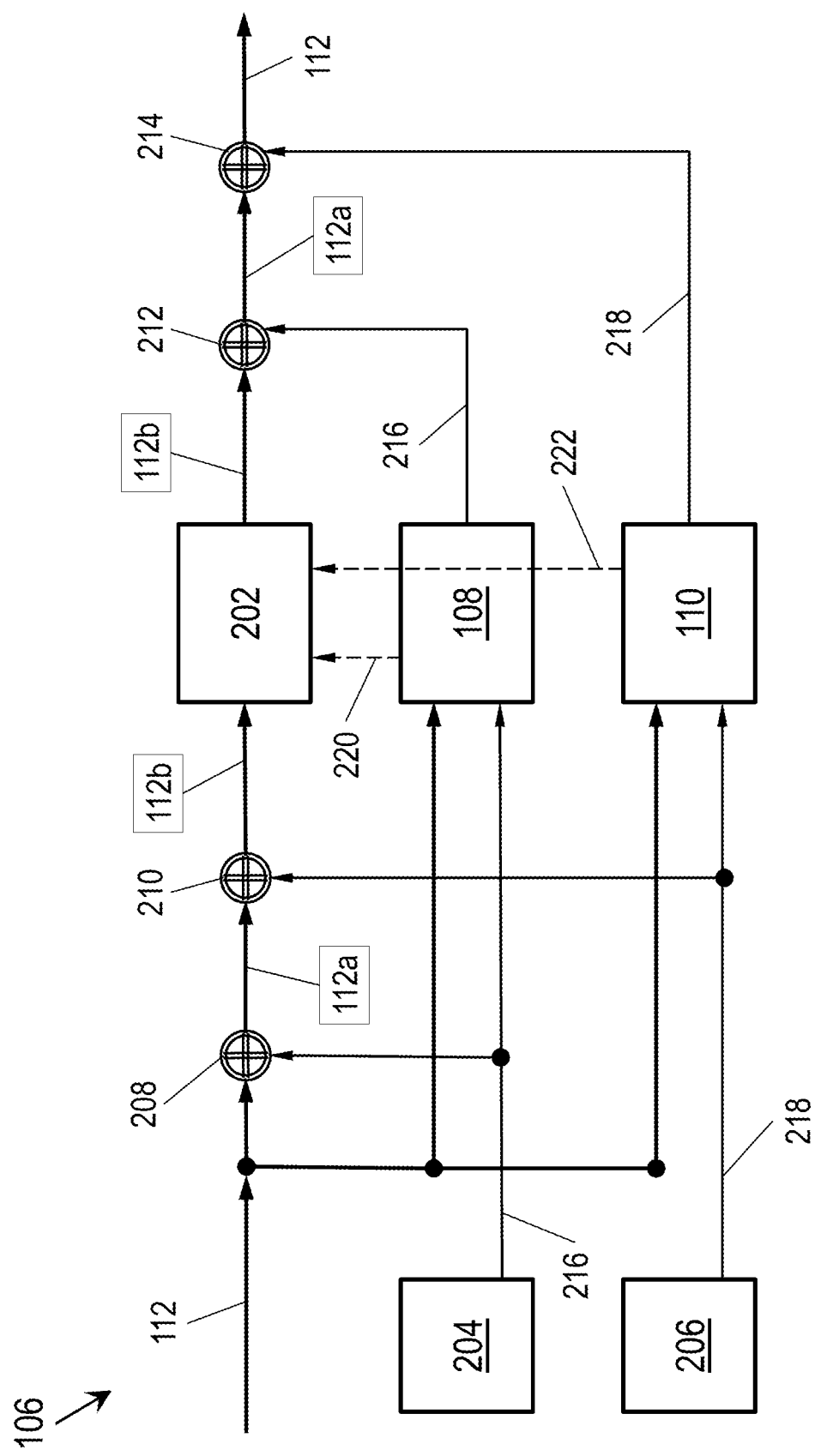
FIG. 2 is a block diagram illustrating the cross-domain cryptographic system of FIG. 1.

Referring now to FIG. 2 the cross-domain solution 106 is disclosed. The cross-domain solution 106 may include, in addition to the primary guard engine 108 and secondary guard engine 110, a holding register 202, random number generators 204, 206 (RNG), and cryptographic engines 208, 210, 212, 214.

In embodiments, the primary and secondary guard engines 108, 110 are connected in parallel between the first domain (102, FIG. 1) and the second domain (104, FIG. 1), while the cryptographic engines 208-214 are connected in series, e.g., a first cryptographic engine 208 and a second cryptographic engine 210 between the first domain and the holding register 202 (e.g., first and second front-end cryptographic engines), and a third cryptographic engine 212 and a fourth cryptographic engine 214 situated between the holding register and the second domain (e.g., first and second back-end cryptographic engines). For example, the first RNG 204 and the second RNG 206 may each generate a unique random number (216, 218) (e.g., one-time pad) for double encryption of each data packet 112 in transit between the first domain 102 and the second domain 104.

In embodiments, the cryptographic engines 208, 210, 212, 214 may be bitwise exclusive-or (XOR) cryptographic engines or any like appropriate cryptographic modules. For example, the first cryptographic engine 208 may encrypt the data packet 112 by computing an XOR of the incoming data packet 112 and the random number 216 received from the first RNG 204. The single-encrypted data packet (112*a*) may then be double-encrypted by the second cryptographic engine in similar fashion computing an XOR using the random number 218 received from the second RNG 206. The double-encrypted data packet (112*b*) may then be stored by the holding register 202 until released by the guard engines 108, 110.

In embodiments, while the first and second cryptographic engines 208, 210 may operate sequentially, the guard engines 108, 110 may operate in parallel. For example, the first guard engine 108 may receive a copy of the first random number 216 generated by the first RNG 204; similarly, the second guard engine 110 may receive a copy of the second random number 218 generated by the second RNG 206. The first guard engine 108 and the second guard engine 110 may inspect the data packet 112 in parallel. In some embodiments, the first guard engine 108 and the second guard engine 110 are redundant (e.g., protecting against a fault in either guard engine). In some embodiments, the first guard engine 108 and the second guard engine 110 are dissimilar (e.g., protecting against latent defects or bugs that may not be detectable by the other guard engine).

In embodiments, when the first guard engine 108 approves the data packet 112 for transfer to the second domain 104, the first guard engine may transmit a release signal (220; e.g., release strobe) to the holding register 202 and transmit the first random number 216 to the third cryptographic engine 212 (e.g., first back-end cryptographic engine). Similarly, when the second guard engine 110 approves the data packet 112 for transfer to the second domain 104, the second guard engine may also transmit a release signal 222 to the holding register 202 and likewise transmit the second random number 218 to the fourth cryptographic engine 214 (e.g., second back-end cryptographic engine). Only when the holding register 202 receives both release signals 220, 222 is the double-encrypted data packet 112*b* released for double decryption by the back-end cryptographic engines 212, 214.

In embodiments, either the first guard engine 108 or the second guard engine 110 may reject the data packet 112. For example, in the event of a rejection the first guard engine 108 may withhold the release signal 220 from the holding register 202 and the random number 216 from the first back-end cryptographic engine 212. Similarly, the second guard engine 110, upon rejecting the data packet 112, may withhold the release signal 222 from the holding register 202 and the random number 218 from the second back-end cryptographic engine 214. In either case, the data packet 112 may be prevented from reaching the second domain 104. In some embodiments, the rejecting guard engine (108, 110) may clear the holding register 202. In the event of a rejection of the data packet 112, the rejecting guard engine (108, 110) may notify the first domain 102 and/or the second domain 104 of the rejection.

In embodiments, the back-end cryptographic engines 212, 214 may sequentially double decrypt the double-encrypted data packet 112*b* for transfer to the second domain 104. For example, the holding register 202 may release the double-encrypted data packet 112*b* (e.g., upon receipt of both release signals 220, 222 as described above) to the third cryptographic engine 212, which partially decrypts the data packet according to the first random number 216 (e.g., canceling out the first front-end cryptographic engine 208). The partially decrypted data packet 112*a* may then be passed to the fourth cryptographic engine 212 for partial decryption (e.g., completion of the sequential decryption process) according to the second random number 218. The double decrypted data packet 112 may then pass to the second domain 104 as a plain text data packet. Any errant release of the data packet 112*b* through the back-end cryptographic engines 212, 214 for decryption prior to the back-end cryptographic engines being updated with the relevant random numbers 216, 218 results in an unrecoverable encrypted data packet 112*a-b* being passed to the second domain 104, maintaining the MILS integrity of the MILS processing environment 100.

In embodiments, implementation of sequential double decryption by the cross-domain solution 106 may enforce sequential redundant inspection of the data packet 112. For example, a failure of either the first or second guard engine 108, 110, resulting in an errant transmission or rejection of the data packet 112*a-b* by either or both guard engines, leaves the outgoing data packet in a single-encrypted (112*a*) or double-encrypted (112*b*) state (e.g., and unrecoverable in either state).

Figure 3:
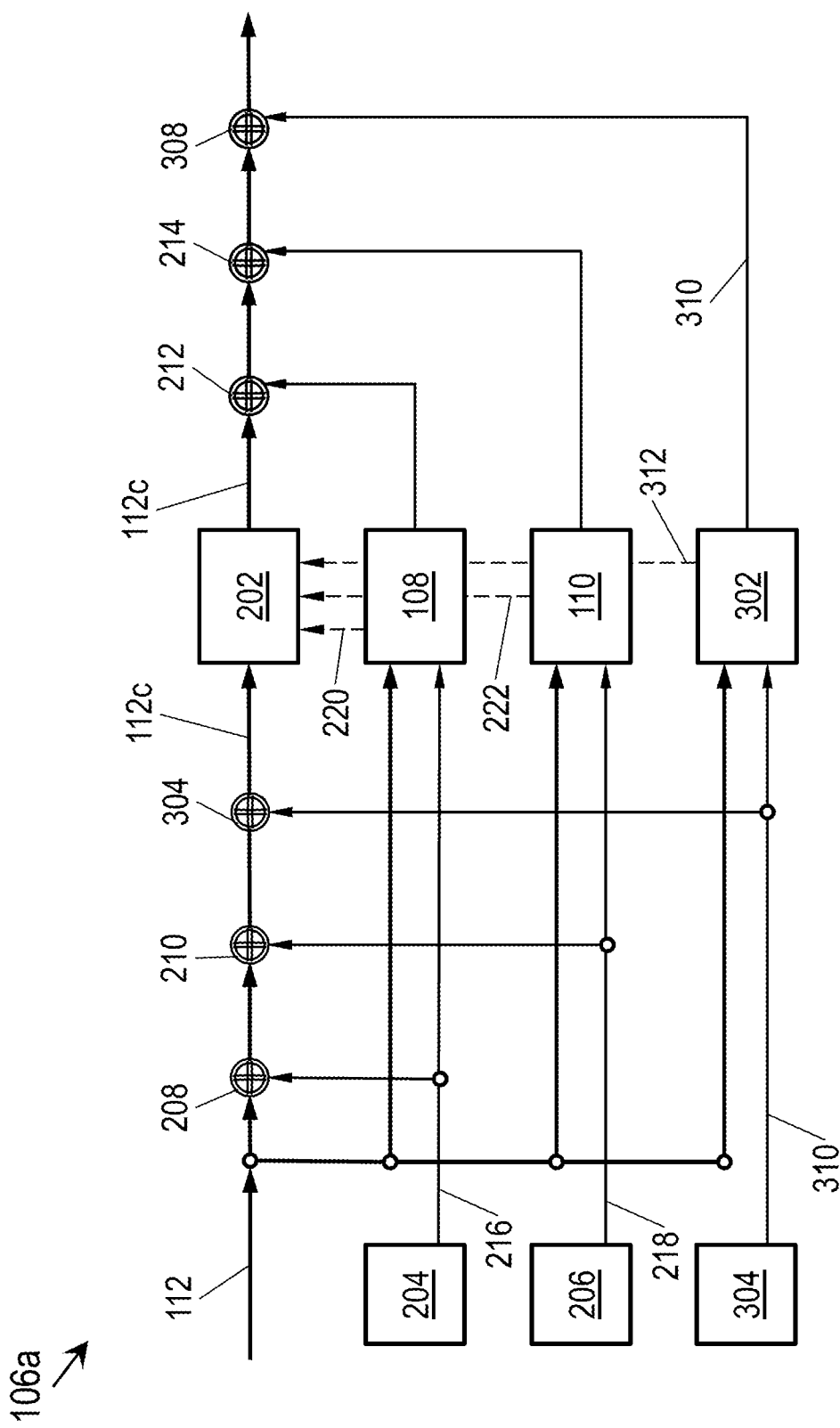
FIG. 3 is a block diagram illustrating the cross-domain cryptographic system of FIG. 1.

Referring to FIG. 3, the cross-domain solution 106*a* may be implemented and may function similarly to the cross-domain solution 106 of FIG. 2, except that the cross-domain solution 106*a* may be scaled up to include three parallel guard engines 108, 110, 302; three RNGs 204, 206, 304; and three front-end and back-end cryptographic engines (e.g., front-end cryptographic engines 208, 210, 306 and back-end cryptographic engines 212, 214, 308).

In embodiments, the cross-domain solution 106*a* may sequentially triple-encrypt the data packet 112 via front-end cryptographic engines 208, 210, 306 according to random numbers 216, 218, 310. The triple-encrypted data packet 112*c* (e.g., after the third and final stage of sequential encryption by the third front-end cryptographic engine 304) may be stored by the holding register 202 until release signals 220, 222, 312 are received from all three guard engines 108, 110, 302 indicating their inspection and approval of the data packet 112. The released triple-encrypted data packet 112*c* may be sequentially decrypted by the back-end cryptographic engines 212, 214, 308 according to the random numbers 216, 218, 310 transmitted to the back-end cryptographic engines by the guard engines 108, 110, 302 upon inspection and approval of the data packet 112.

In embodiments, the cross-domain solution 106a may be further scaled up as needed to accommodate four or more parallel guard engines and RNGs as necessary or desired.

Figure 4A:
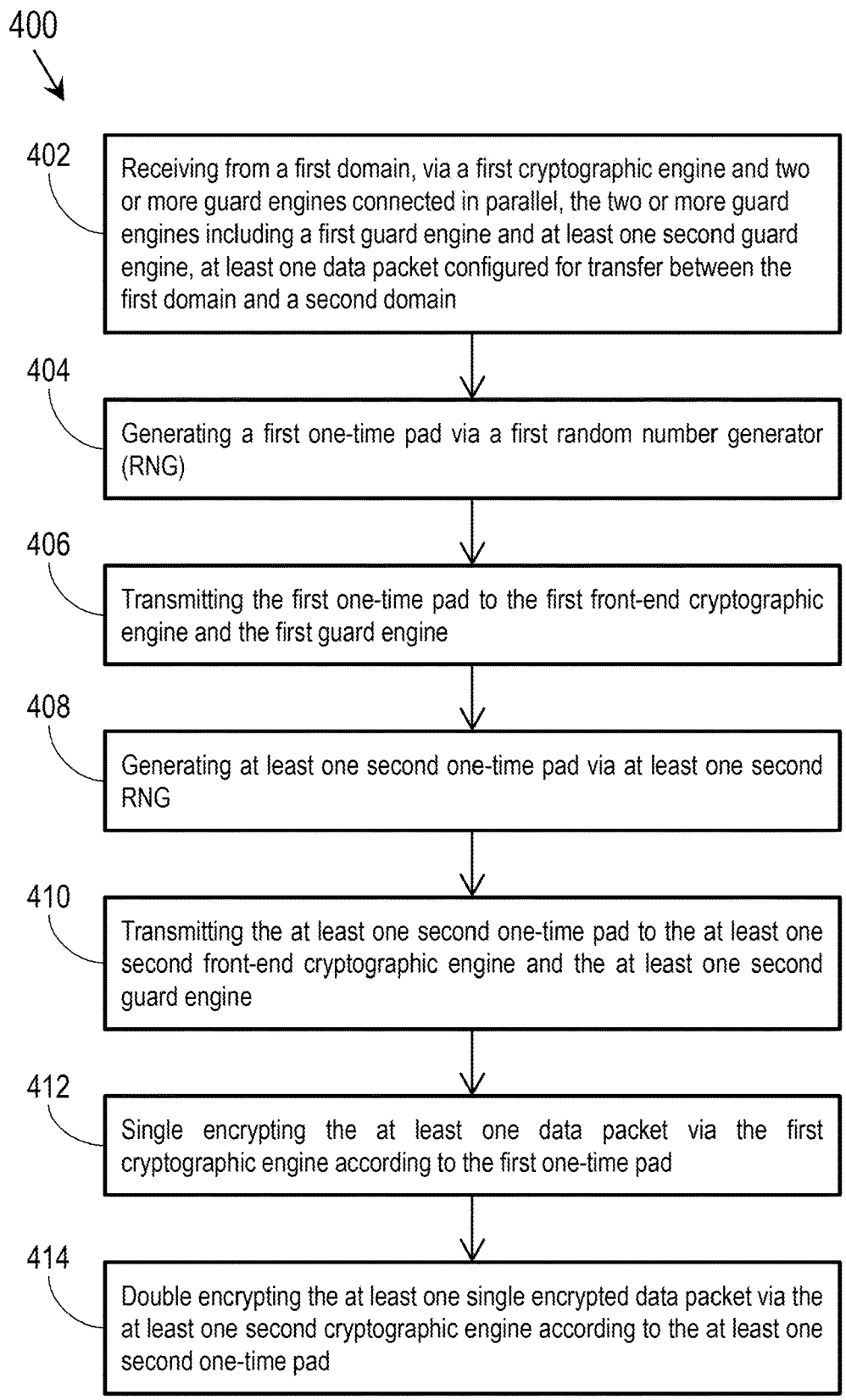
FIGS. 4A through 4C are flow diagrams illustrating a method for parallel cross-domain inspection with sequential cryptographic control according to example embodiments of this disclosure.

Referring now to FIG. 4A, the method 400 may be implemented by the MILS processing environment 100 and may incorporate the following steps.

At a step 402, the first and second parallel guard engines, as well as the first front-end cryptographic engine, receive a data packet in transit from a first domain having a first security classification to a second domain having a second security classification.

At a step 404, the first random number generator (RNG) generates a first one-time pad.

At a step 406, the first RNG transmits the first one-time pad to the first guard engine and the first front-end cryptographic engine.

At a step 408, the second RNG generates a second one-time pad.

At a step 410, the second RNG transmits the second one-time pad to the second guard engine and the second front-end cryptographic engine.

At a step 412, the first front-end cryptographic engine partially encrypts (e.g., single-encrypts) the data packet according to the first one-time pad.

At a step 414, the second front-end cryptographic engine doubly encrypts (e.g., completes the double encryption process) the data packet according to the second one-time pad.

Figure 4B:
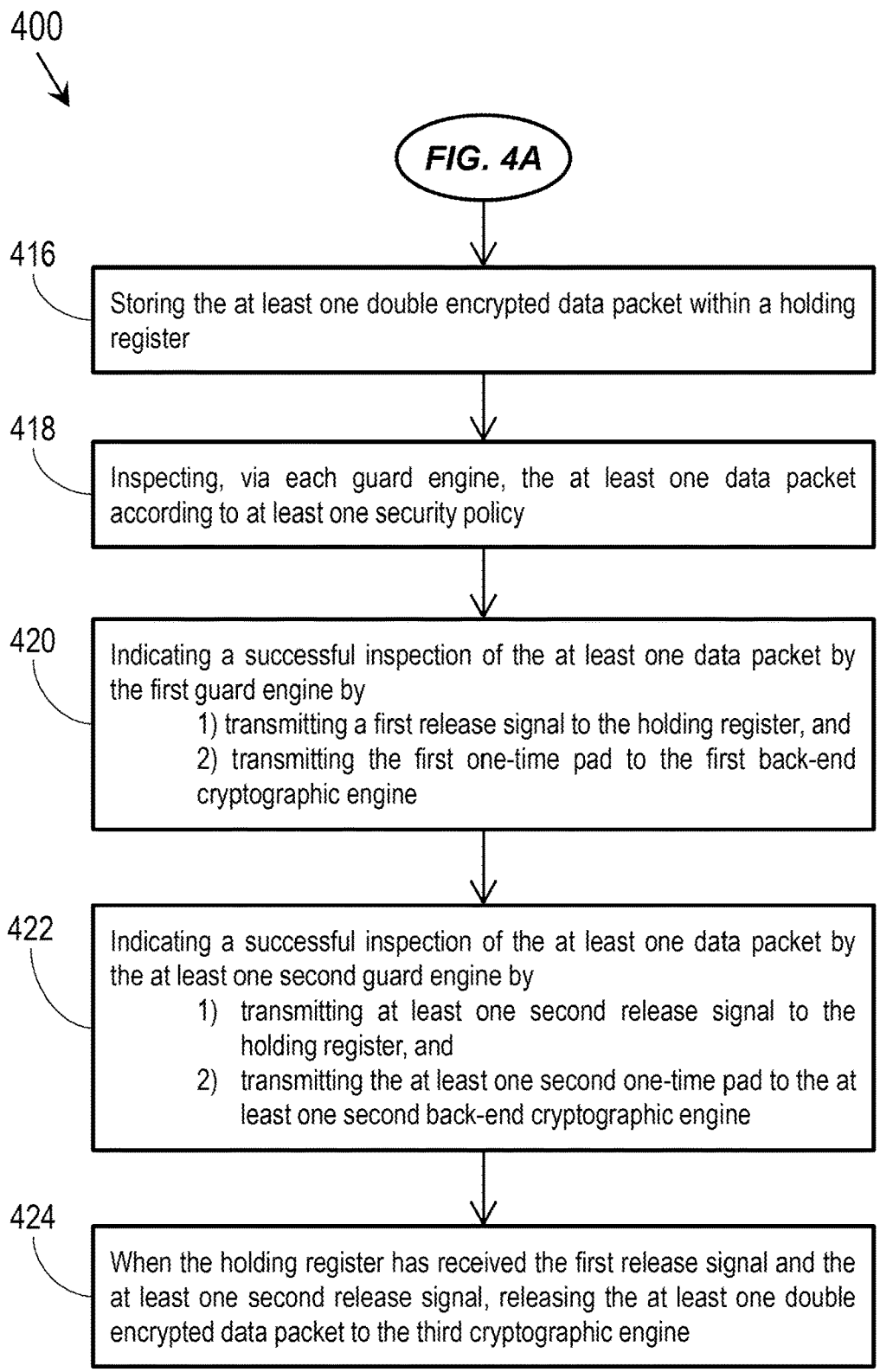

Referring also to FIG. 4B, at a step 416, the double-encrypted data packet is stored within the holding register.

At a step 418, each of the parallel guard engines inspects the data packet according to one or more security policies. In some embodiments, the parallel guard engines are redundant guard engines with similar policy sets. In other embodiments, the guard engines are dissimilar guard engines, each dissimilar guard engine inspecting the data packet according to one or more distinct policy sets.

At a step 420, the first guard engine indicates its acceptance or approval of the data packet by transmitting a first release signal to the holding register and transmitting the first one-time pad to the first back-end cryptographic engine. In some embodiments, the first guard engine indicates a rejection of the data packet by withholding the first release signal and/or the first one-time pad. In some embodiments, the first guard engine clears the holding register. In some embodiments, the first guard engine notifies the first and/or second domains of the packet rejection.

At a step 422, the second guard engine indicates its acceptance or approval of the data packet by transmitting a second release signal to the holding register and transmitting the second one-time pad to the second back-end cryptographic engine. In some embodiments, the second guard engine indicates a rejection of the data packet by withholding the second release signal and/or the second one-time pad. In some embodiments, the second guard engine clears the holding register. In some embodiments, the second guard engine notifies the first and/or second domains of the packet rejection.

At a step 424, when the holding register has received release signals from both (e.g., all) parallel guard engines, the holding register releases the double encrypted data packet to the first back-end cryptographic engine.

Figure 4C:
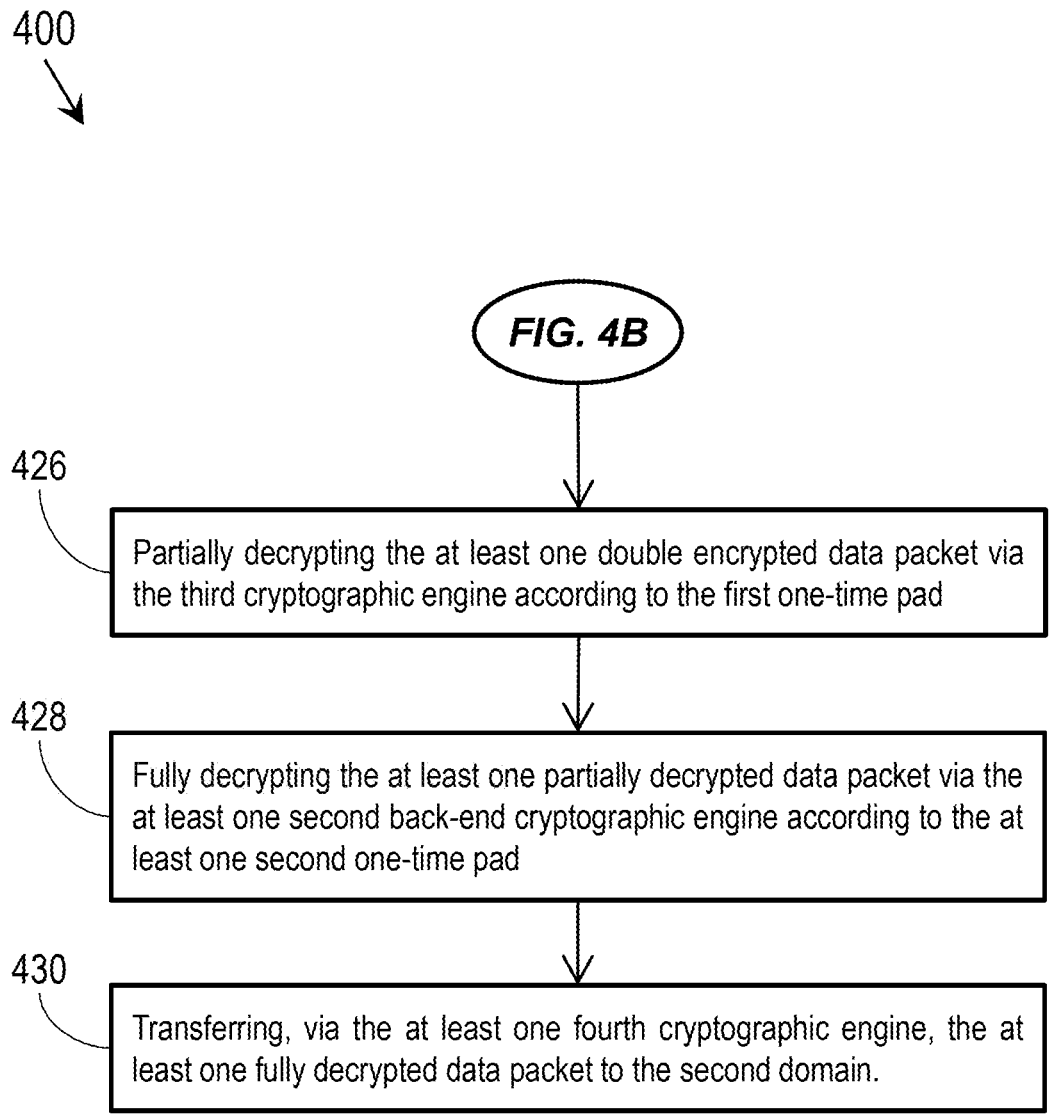

Referring also to FIG. 4C, at a step 426, the first back-end cryptographic engine partially decrypts the double encrypted data packet according to the first one-time pad.

At a step 428, the second back-end cryptographic engine partially decrypts the single encrypted data packet (e.g., completes the double decryption process) according to the second one-time pad.

At a step 430, the fully decrypted data packet is transferred to the second domain.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:
1. A cross-domain cryptographic system, comprising:
two or more guard engines connected in parallel between a first domain associated with at least one security classification level and a second domain associated with at least one security classification level, the two or more guard engines each configured to receive from the first domain at least one data packet configured for transfer to the second domain, the two or more guard engines comprising a first guard engine and at least one second guard engine;
at least one holding register communicatively coupled to the first domain and to the second domain;
a first random number generator (RNG) communicatively coupled to the first guard engine and configured to generate a first one-time pad;
at least one second RNG communicatively coupled to the at least one second guard engine and configured to generate at least one second one-time pad;
a first front-end cryptographic engine communicatively coupled to the first domain and to the first RNG, the first front-end cryptographic engine configured to encrypt the received data packet according to the first one-time pad;
at least one second front-end cryptographic engine communicatively coupled to the first front-end cryptographic engine and to the at least one second RNG, the at least one second front-end cryptographic engine configured to:
double encrypt the at least one encrypted data packet according to the at least one second one-time pad; and transfer the at least one double encrypted data packet to the holding register;
a first back-end cryptographic engine communicatively coupled to the holding register and to the first guard engine;
at least one second back-end cryptographic engine communicatively coupled to the first back-end cryptographic engine, to the second domain, and to the at least one second guard engine;
the first guard engine and the at least one second guard engine configured to inspect the at least one data packet according to at least one security policy, the first guard engine configured to indicate a successful inspection by:
transmitting a first release signal to the holding register; and
transmitting the first one-time pad to the first back-end cryptographic engine;
and the second guard engine configured to indicate a successful inspection by:
transmitting at least one second release signal to the holding engine; and
transmitting the at least one second one-time pad to the at least one second back-end cryptographic engine;
the holding register configured to, upon receipt of the first release signal and the at least one second release signal, transfer the at least one double encrypted data packet to the first back-end cryptographic engine;
the first back-end cryptographic engine configured to generate at least one single-encrypted data packet by decrypting the at least one double encrypted data packet according to the first one-time pad; and
the at least one second back-end cryptographic engine configured to:
decrypt the at least one single-encrypted data packet according to the at least one second one-time pad; and
transfer the at least one decrypted data packet to the second domain.

2. The cross-domain cryptographic system of claim 1, wherein the first front-end cryptographic engine, the at least one second front-end cryptographic engine, the first first back-end cryptographic engine, and the at least one second back-end cryptographic engine include at least one bitwise exclusive-or (XOR) cryptographic engine.

3. The cross-domain cryptographic system of claim 1, wherein the two or more guard engines are redundant guard engines.

4. The cross-domain cryptographic system of claim 1, wherein the two or more guard engines are dissimilar guard engines, the first guard engine configured to inspect the at least one data packet according to at least one first security policy and the at least one second guard engine configured to inspect the at least one data packet according to at least one second security policy.

5. The cross-domain cryptographic system of claim 1, wherein the first guard engine is configured to indicate a rejection of the at least one data packet by withholding at least one of the first release signal and the first one-time pad.

6. The cross-domain cryptographic system of claim 1, wherein the at least one second guard engine is configured to indicate a rejection of the at least one data packet by withholding at least one of the second release signal and the second one-time pad.

7. The cross-domain cryptographic system of claim 1, wherein one or more of the first guard engine and the at least one second guard engine is configured to indicate a rejection of the at least one data packet by clearing the holding register.

8. The cross-domain cryptographic system of claim 1, wherein one or more of the first guard engine and the at least one second guard engine is configured to indicate a rejection of the at least one data packet by notifying one or more of the first domain and the second domain.

9. A method for parallel cross-domain inspection with sequential cryptographic control, the method comprising:
receiving from a first domain, via a first cryptographic engine and two or more guard engines connected in parallel, the two or more guard engines including a first guard engine and at least one second guard engine, at least one data packet configured for transfer between the first domain and a second domain;
generating a first one-time pad via a first random number generator (RNG);
transmitting the first one-time pad to the first front-end cryptographic engine and the first guard engine;
generating at least one second one-time pad via at least one second RNG;
transmitting the at least one second one-time pad to the at least one second front-end cryptographic engine and the at least one second guard engine;
single encrypting the at least one data packet via the first front-end cryptographic engine according to the first one-time pad;
double encrypting the at least one single encrypted data packet via the at least one second front-end cryptographic engine according to the at least one second one-time pad;
storing the at least one double encrypted data packet within a holding register;
inspecting, via each guard engine, the at least one data packet according to at least one security policy;
indicating a successful inspection of the at least one data packet by the first guard engine by 1) transmitting a first release signal to the holding register and 2) transmitting the first one-time pad to the first back-end cryptographic engine;
indicating a successful inspection of the at least one data packet by the at least one second guard engine by 1) transmitting at least one second release signal to the holding register and 2) transmitting the at least one second one-time pad to the at least one second back-end cryptographic engine;
when the holding register has received the first release signal and the at least one second release signal, releasing the at least one double encrypted data packet to the first back-end cryptographic engine;
partially decrypting the at least one double encrypted data packet via the first back-end cryptographic engine according to the first one-time pad;
fully decrypting the at least one partially decrypted data packet via the at least one second back-end cryptographic engine according to the at least one second one-time pad; and
transferring, via the at least one second back-end cryptographic engine, the at least one fully decrypted data packet to the second domain.

10. The method of claim 9, wherein the two or more guard engines are redundant guard engines.

11. The method of claim 9, wherein the two or more guard engines are dissimilar guard engines and inspecting, via each guard engine, the at least one data packet according to at least one security policy, includes:
- inspecting, via the first guard engine, the at least one data packet according to at least one first security policy; and
- inspecting, via the at least one second guard engine, the at least one data packet according to at least one second security policy.

12. The method of claim 9, wherein indicating a successful inspection of the at least one data packet by the first guard engine by 1) transmitting a first release signal to the holding register and 2) transmitting the first one-time pad to the first back-end cryptographic engine includes:
- indicating a rejection of the at least one data packet by the first guard engine by withholding at least one of the first release signal and the first one-time pad.

13. The method of claim 9, wherein indicating a successful inspection of the at least one data packet by the at least one second guard engine by 1) transmitting at least one second release signal to the holding register and 2) transmitting the at least one second one-time pad to the at least one second back-end cryptographic engine includes:
- indicating a rejection of the at least one data packet by the at least one second guard engine by withholding one or more of the at least one second release signal and the at least one second one-time pad.

* * * * *